United States Patent
Osawa

(10) Patent No.: US 7,091,279 B2
(45) Date of Patent: Aug. 15, 2006

(54) CURABLE FLUOROPOLYETHER RUBBER COMPOSITIONS AND RUBBER ARTICLES

(75) Inventor: Yasuhisa Osawa, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 398 days.

(21) Appl. No.: 10/642,179

(22) Filed: Aug. 18, 2003

(65) Prior Publication Data

US 2005/0043480 A1 Feb. 24, 2005

(30) Foreign Application Priority Data

Aug. 15, 2002 (JP) .............................. 2002-236914

(51) Int. Cl.
*C08L 83/05* (2006.01)

(52) U.S. Cl. .......................... 524/588; 528/31; 528/25; 556/445

(58) Field of Classification Search ................ 524/588; 528/31, 25; 556/445

See application file for complete search history.

(56) References Cited

U.S. PATENT DOCUMENTS 5,837,774 A * 11/1998 Tarumi et al. ............... 525/104

FOREIGN PATENT DOCUMENTS

| EP | 1170320 A1 | 1/2002 |
| EP | 1172415 A1 | 1/2002 |
| EP | 1217025 A1 | 6/2002 |
| JP | 2990646 B2 | 10/1999 |

* cited by examiner

*Primary Examiner*—Kuo-Liang Peng
(74) *Attorney, Agent, or Firm*—Birch, Stewart, Kolasch & Birch, LLP

(57) ABSTRACT

A curable fluoropolyether rubber composition comprising (A) a straight-chain fluoropolyether compound having at least two alkenyl groups in a molecule and a perfluoropolyether structure in the backbone, (B) an organosilicon compound having at least two hydrosilyl groups in a molecule, (C) a compound containing at least one fluorine atom and at least one benzene ring in a molecule, free of a polar group, having a melting point of at least 50° C., in powder form, and (D) a hydrosilylation catalyst cures into a rubber product having solvent resistance, chemical resistance, improved mold release property and satisfactory compression set.

6 Claims, No Drawings

CURABLE FLUOROPOLYETHER RUBBER COMPOSITIONS AND RUBBER ARTICLES

This invention relates to curable fluoropolyether rubber compositions which cure into rubber products having good solvent resistance, chemical resistance, weather resistance, parting property, water repellency, oil repellency and heat resistance as well as improved mold release and compression set, and rubber articles obtained therefrom.

BACKGROUND ART

Japanese Patent No. 2,990,646 (JP-A 8-199070) discloses a composition comprising a straight-chain fluoropolyether compound having at least two alkenyl groups in a molecule and a perfluoropolyether structure in the backbone, an organosilicon compound having at least two H—SiOSiO structures in a molecule, and a hydrosilylation catalyst, which cures into parts having a good profile of heat resistance, chemical resistance, solvent resistance, water repellency, oil repellency, weather resistance and the like.

This fluoropolyether rubber composition can be readily formed into most shapes. In the case of complex shape parts or thin-wall parts like diaphragms, however, it is difficult to remove the molded composition from the mold because of tackiness. Since the difficulty of mold release leads to low production yields of molding step and an increased duration of molding cycle, there is a need for further improvement in processability.

If customarily used mold release agents of the internal addition type for rubber materials based on silicone oil and surfactant (known as internal mold release agents) are incorporated, they invite a rise of viscosity and a loss of fluidity, leading to molding difficulties. It was then proposed to improve mold release by adding a compound containing at least one fluorine atom and at least one hydroxyl group in a molecule and having a melting point of at least 50° C. in powder form as typified by bisphenol AF. This additive is effective for improving mold release, but regrettably exacerbates the compression set which is one of important physical properties of rubber.

SUMMARY OF THE INVENTION

An object of the invention is to provide curable fluoropolyether rubber compositions which when cured, exhibit good solvent resistance, chemical resistance, weather resistance, parting property, water repellency, oil is repellency and heat resistance, and especially improved mold release property as well as satisfactory compression set. Another object is to provide rubber articles made therefrom.

It has been found that by incorporating a compound containing at least one fluorine atom and at least one benzene ring in a molecule, free of a polar group, and having a melting point of at least 50° C., in powder form in a fluoropolyether rubber composition, the composition is improved in mold release and compression set properties without an increase of viscosity.

In one aspect, the invention provides a curable fluoropolyether rubber composition comprising (A) a straight-chain fluoropolyether compound having at least two alkenyl groups in a molecule and a perfluoropolyether structure in the backbone, (B) an organosilicon compound having at least two silicon atom-bonded hydrogen atoms in a molecule, (C) a compound having at least one fluorine atom and at least one benzene ring in a molecule and free of a polar group, the compound having a melting point of at least 50° C. and being in powder form, and (D) a hydrosilylation catalyst.

In a second aspect, the present invention provides a rubber article comprising the curable fluoropolyether rubber composition in the cured state.

DESCRIPTION OF THE PREFERRED EMBODIMENT

Component (A) of the curable fluoropolyether rubber composition according to the invention is a straight-chain fluoropolyether compound having at least two alkenyl groups in a molecule and a perfluoropolyether structure in the backbone.

The preferred alkenyl groups in the straight-chain fluoropolyether compound are alkenyl groups of 2 to 8 carbon atoms having a $CH_2=CH-$ structure at an end such as vinyl, allyl, propenyl, isopropenyl, butenyl and hexenyl groups, with the vinyl and allyl being preferred. The alkenyl groups may be attached to the backbone of the straight-chain fluoropolyether compound at opposite ends either directly or through divalent linkages such as $-CH_2-$, $-CH_2O-$ or $-Y-NR-CO-$. Herein Y is $-CH_2-$ or

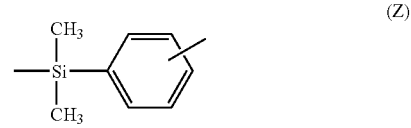

(inclusive of o-, m- and p-positions) and R is hydrogen, methyl, phenyl or allyl. In component (A), at least two alkenyl groups must be contained per molecule.

The straight-chain fluoropolyether compound (A) has a perfluoropolyether structure in its backbone, which is described later.

One illustrative example of component (A) is a branched polyfluorodialkenyl compound having the following general formula (2).

Herein X is $-CH_2-$, $-CH_2O-$, $-CH_2OCH_2-$ or $-Y-NR-CO-$ wherein Y is $-CH_2-$ or an o, m or p-dimethylsilylphenylene group of the following structural formula (Z):

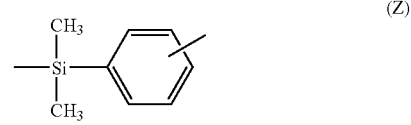

and R is hydrogen or a substituted or unsubstituted monovalent hydrocarbon group, X' is $-CH_2-$, $-OCH_2-$, $-CH_2OCH_2-$ or $-CO-NR-Y'-$ wherein Y' is $-CH_2-$ or an o, m or p-dimethylsilylphenylene group of the following structural formula (Z'):

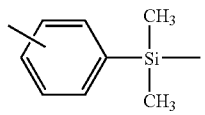

and R is as defined above, $Rf^1$ is a divalent perfluoropolyether group, and

"a" is independently 0 or 1.

In formula (2), $Rf^1$ is a divalent perfluoropolyether structure, preferably having the following general formula (i) or (ii).

Herein, p and q each are an integer of 1 to 150, the sum of p+q is 2 to 200 on average, r is an integer of 0 to 6, and t is 2 or 3.

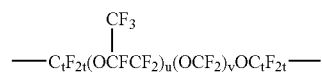

Herein, u is an integer of 1 to 200, v is an integer of 1 to 50, and t is as defined above.

Another illustrative example of component (A) is a branched polyfluoromonoalkenyl compound having the following general formula (3).

Herein X' and "a" are as defined above, $Rf^2$ is a group of the general formula (iii):

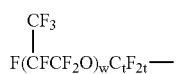

wherein t is as defined above, and w is an integer of at least 1, which is smaller than any of the sum of p+q (average) and r and the sum of u and v for $Rf^1$ in formula (2).

Preferred examples of component (A) are compounds having the following general formula (1).

Herein X is —$CH_2$—, —$CH_2O$—, —$CH_2OCH_2$— or —Y—NR—CO— wherein Y is —$CH_2$— or a group of the following structural formula (Z):

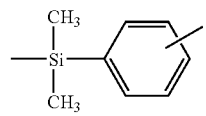

(o, m or p-position), and R is hydrogen, methyl, phenyl or allyl,

X' is —$CH_2$—, —$OCH_2$—, —$CH_2OCH_2$— or —CO—NR—Y'— wherein Y' is —$CH_2$— or a group of the following structural formula (Z'):

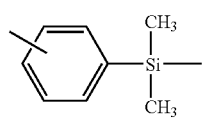

(o, m or p-position), and R is as defined above,

"a" is independently 0 or 1, L is an integer of 2 to 6, and b and c each are an integer of 0 to 200.

Component (B) is an organosilicon compound having at least two silicon atom-bonded hydrogen atoms (i.e., SiH groups) in a molecule. The organosilicon compound (B) serves as a crosslinking agent and chain extender for component (A). When compatibility with and dispersion in component (A) and uniformity after curing are taken into account, the organosilicon compound should preferably have at least one fluorinated group in a molecule.

Suitable fluorinated groups include those of the following general formulae.

Letter g is an integer of 1 to 20, preferably 2 to 10.

Letter g is an integer of 1 to 20, preferably 2 to 10.

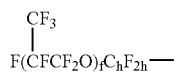

Letter f is an integer of 2 to 200, preferably 2 to 100, and h is an integer of 1 to 3.

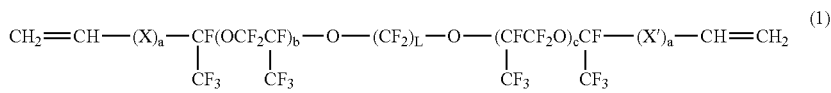

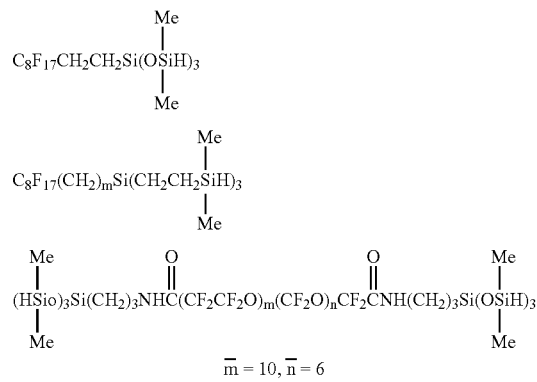
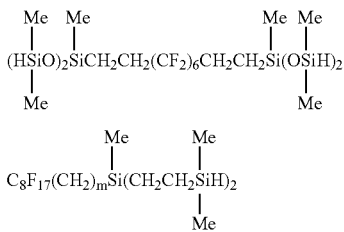
Letters i and j each are an integer of at least 1, and an average of i+j is from 2 to 200, preferably from 2 to 100.
Examples of the organosilicon compounds having such fluorinated groups are shown below. Note that Me is methyl and Ph is phenyl.
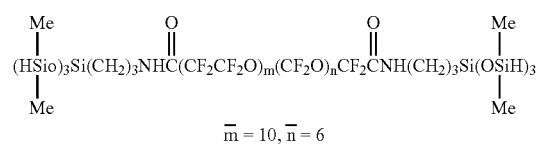
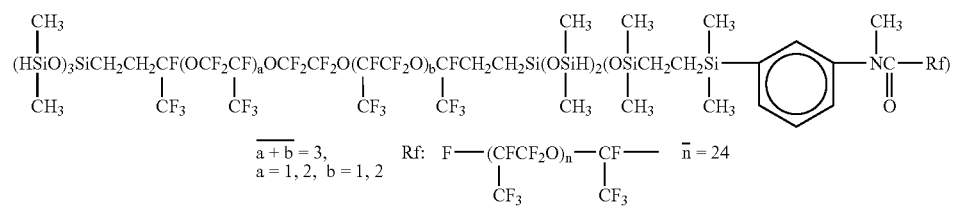
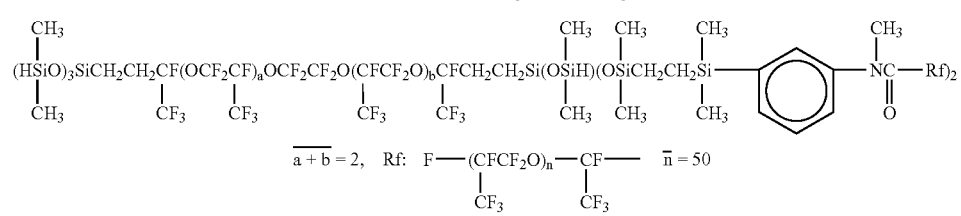
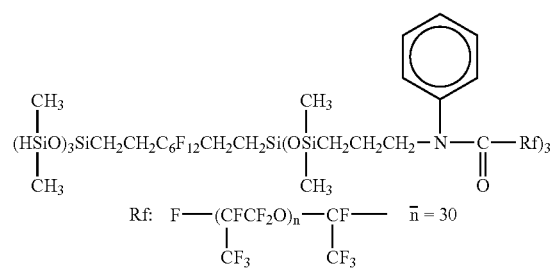
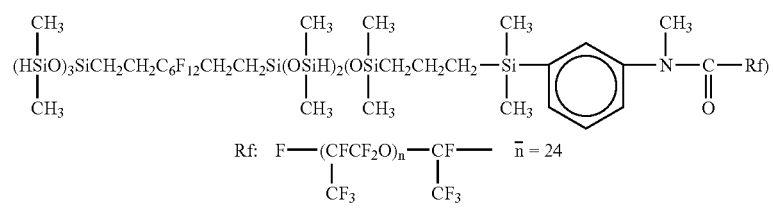
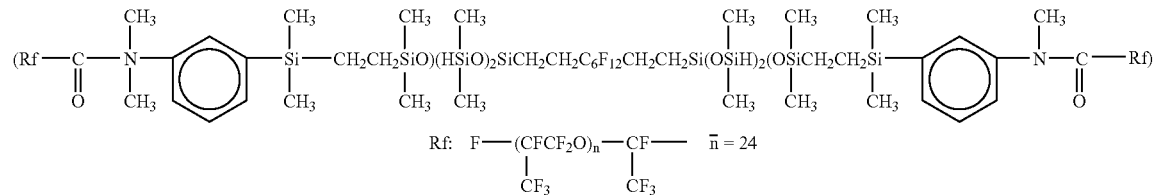

-continued
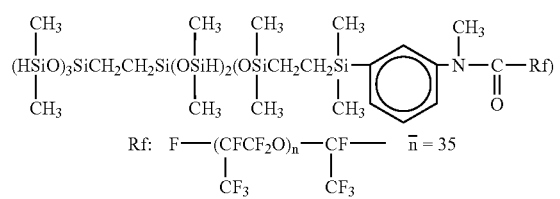 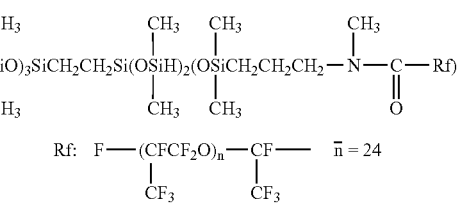
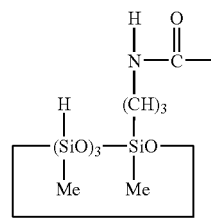 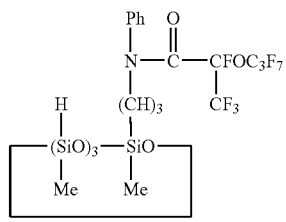
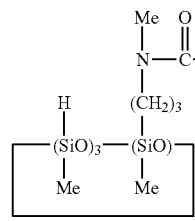 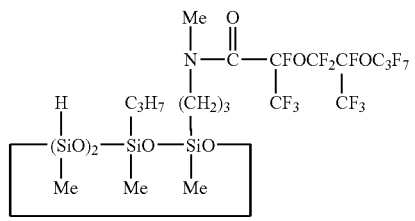
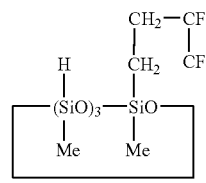 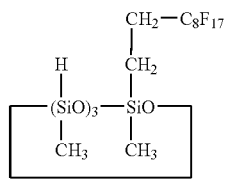
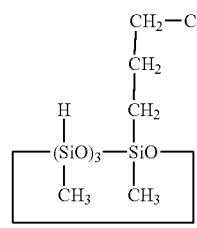 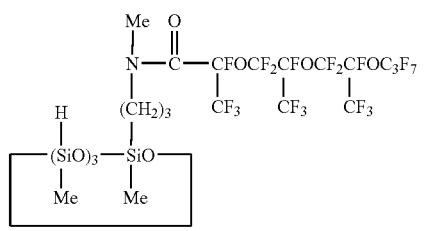
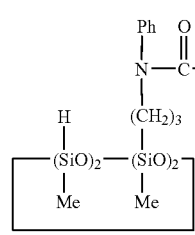 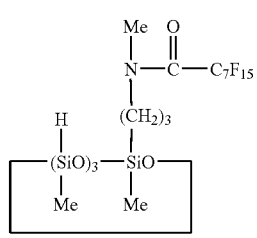
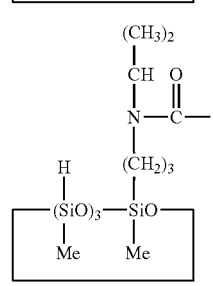

-continued
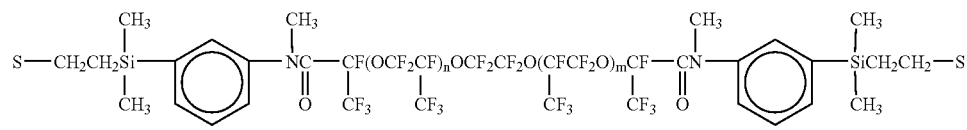
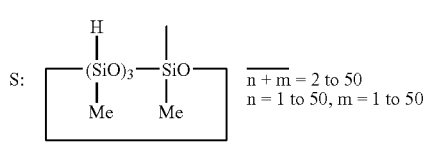
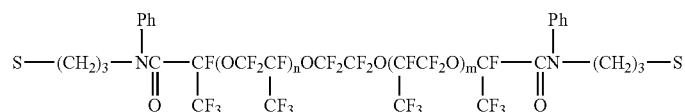
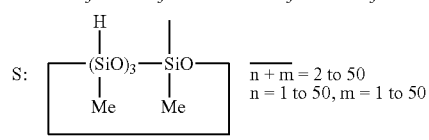
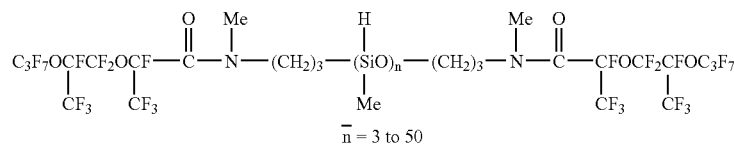
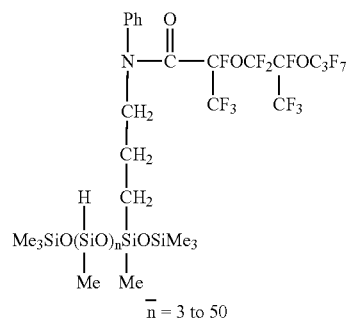
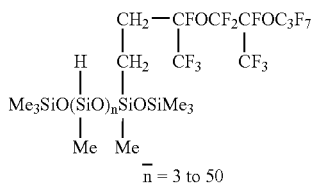
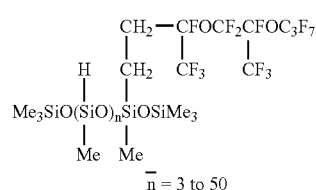
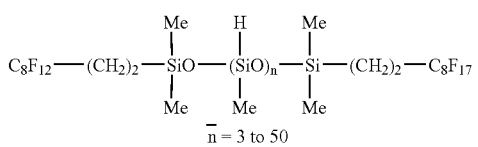
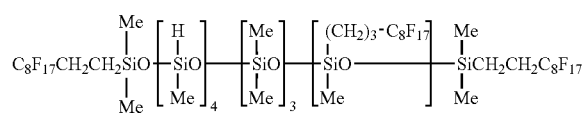
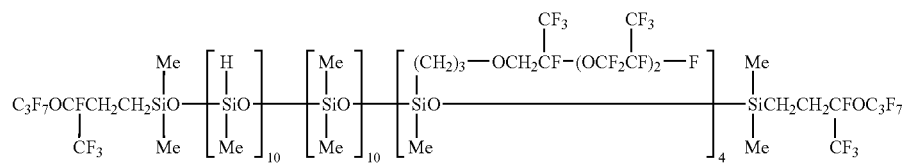
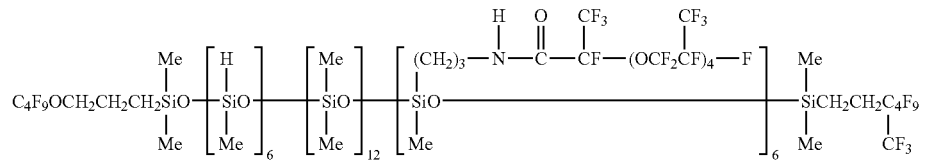

-continued

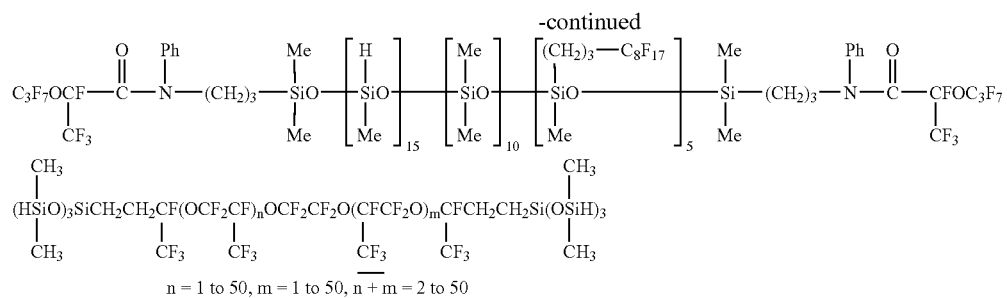

n = 1 to 50, m = 1 to 50, $\overline{n+m}$ = 2 to 50

These organosilicon compounds may be used alone or in admixture of two or more.

Component (B) is blended in an effective amount to cure component (A). Most often, component (B) having hydrosilyl (or SiH) groups is blended in such an amount as to provide 0.5 to 5 mol, and more preferably 1 to 2 mol of SiH groups per mol of alkenyl groups (e.g., vinyl, allyl or cycloalkenyl) in component (A). Less amounts of component (B) may achieve an insufficient degree of crosslinking. Excessive amounts of component (B) may allow chain lengthening to become preferential, inviting under-curing, foaming, and degradation of heat resistance and compression set.

Component (C) is a compound containing at least one fluorine atom and at least one benzene ring in a molecule, free of a polar group, and having a melting point of at least 50° C., in powder form. Component (C) which is very important in the present invention is an internal mold release agent of imparting release properties in the step of shaping in a mold without detracting from compression set.

If a customary liquid internal mold release agent is added to a polymer component, the resulting composition becomes thickened due to the lack of compatibility therebetween, and thus difficult to work. This approach is impractical. Sometimes, the liquid internal mold release agent will separate from the composition during storage. In this sense, it is crucial that the internal mold release agent (C) be solid or powder during storage at room temperature. Storage stability requires the agent to have a melting point of at least 50° C.

For dispersion in component (A), the molecular structure of the agent should contain at least one, especially at least two fluorine atoms per molecule. Absent a fluorine atom, the agent is difficult to disperse in the composition uniformly. The agent should also contain at least one, especially at least two benzene rings. It is believed that the benzene ring acts on the terminal benzene ring of a polymer to improve mold release properties, affect compression set and contribute to heat resistance. Further the agent should not contain polar groups such as hydroxyl, carbonyl, carboxylic acid, ester and acid anhydride groups in the molecular structure. This is because polar groups, if present, can enhance the scission of crosslinking sites and the interaction between fillers, exacerbating compression set.

Component (C) is distributed uniformly throughout the composition to provide good release properties, which are effective not only for preventing molded rubber parts from sticking to the mold, but also for preventing fabricated parts thereof having a machined, cut or abraded surface from seizing on the tool. Independent of whether the rubber is as molded or as fabricated, when molded parts or a molded part and another material are used under pressure contact, neither sticking nor bonding occurs therebetween and they can be readily separated.

Component (C) is preferably selected from compounds derived from the following general formula (I') or (II').

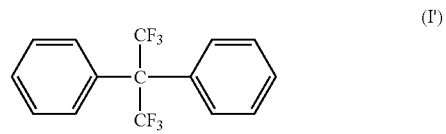

(I')

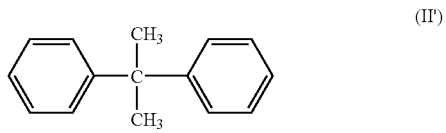

(II')

In the case of compounds derived from formula (I'), some or all hydrogen atoms attached to carbon atoms may be substituted with fluorine. In the case of compounds derived from formula (II'), at least some hydrogen atoms attached to carbon atoms must be substituted with fluorine.

Compounds of the following general formula (I) or (II) are preferred as component (C).

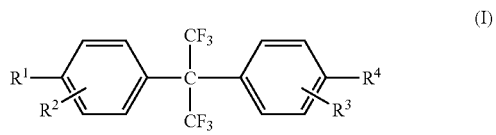

(I)

Herein $R^1$ to $R^4$ are each independently hydrogen, a monovalent hydrocarbon group of 1 to 12 carbon atoms or a substituted monovalent hydrocarbon group of 1 to 12 carbon atoms in which some or all of the hydrogen atoms are substituted with fluorine atoms.

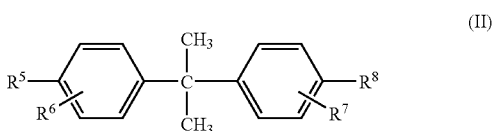

(II)

Herein $R^5$ to $R^8$ are each independently hydrogen or a monovalent hydrocarbon group of 1 to 12 carbon atoms, at least one of $R^5$ to $R^8$ is a substituted monovalent hydrocarbon group of 1 to 12 carbon atoms in which some or all of the hydrogen atoms are substituted with fluorine atoms.

Illustratively, preferred compounds used herein are 2,2-bis(4-methylphenyl)hexafluoropropane of formula (I-a), 2,2-bis(3,4-dimethylphenyl)hexafluoropropane of formula (I-b), and 2,2-bis(4-trifluoromethylphenyl)propane of formula (II-a) as shown below.

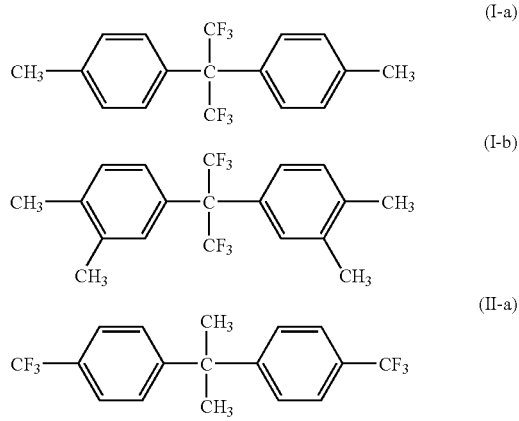

The former two, 2,2-bis(4-methylphenyl)hexafluoro-propane and 2,2-bis(3,4-dimethylphenyl)hexafluoropropane have a stable chemical structure and are commercially manufactured, readily available and empirically safe. They are available in fine powder form having a melting point of 82° C. and 77° C., respectively. 2,2-bis(4-trifluoromethylphenyl)propane is a fine powder having a melting point of 83° C.

Preferably 0.1 to 20 parts by weight of component (C) is added to 100 parts by weight of component (A). The amount of component (C) added is more preferably 0.5 to 10 parts by weight, most preferably 1 to 5 parts by weight when a balance of mold release and mechanical properties and stability are taken into account. Mold release may not be expected at less than 0.1 part of component (C) whereas more than 20 parts of component (C) may sometimes degrade mechanical properties.

Component (D) is a hydrosilylation catalyst for promoting the addition reaction between alkenyl groups in component (A) and hydrosilyl groups in component (B). The hydrosilylation catalyst is often selected from noble metal compounds which are expensive. Platinum and platinum compounds are thus used because they are readily available.

Exemplary platinum compounds include chloroplatinic acid, complexes of chloroplatinic acid with olefins such as ethylene, complexes of chloroplatinic acid with alcohols and vinylsiloxanes, and metallic platinum supported on silica, alumina or carbon though not limited thereto. Known platinum group metal compounds other than the platinum compounds include rhodium, ruthenium, iridium, and palladium compounds, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$ wherein Ph denotes phenyl.

The hydrosilylation catalyst may be used in a catalytic amount. It is preferably added in an amount to give 0.1 to 100 parts by weight of platinum group metal per million parts by weight of components (A), (B) and (C) combined.

In addition to the foregoing components (A) to (D), fillers, typically reinforcing fillers may be added to the inventive composition for improving mechanical strength. Reinforcing fillers are added for the purposes of improving mechanical strength, thermal stability, weather resistance, chemical resistance and/or flame retardance, reducing thermal shrinkage upon curing, reducing the coefficient of thermal expansion of the cured elastomer, and/or lowering the gas permeability. The major purpose is to improve mechanical strength.

Exemplary fillers include fumed silica, wet silica, ground silica, calcium carbonate, diatomaceous earth, carbon black and various metal oxide powders, which may be treated with surface treating agents, if desired. Among others, fumed silica is preferred from the standpoint of improving mechanical strength. Fumed silica treated with a silane base surface treating agent is especially preferred because it is effectively dispersible.

The filler is preferably added in an amount of 5 to 200 parts by weight per 100 parts by weight of component (A). The amount of the filler preferred for the stability of mechanical properties is 10 to 60 parts by weight.

If desired, pigments, dyes and the like may be compounded in the curable fluoropolyether rubber composition of the invention. Insofar as the benefits of the invention are not impaired, various additives may be added to the inventive composition. Such optional additives include inhibitors of the hydrosilylation catalyst, for example, acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutenol; 3-methyl-3-penten-1-yne, 3,5-dimethyl-3-hexen-1-yne, and the like; polymethylvinylsiloxane cyclic compounds; and organophosphorus compounds. Incorporation of such an inhibitor leads to a compromise between cure reactivity and storage stability.

The method of preparing the curable fluoropolyether rubber composition of the invention is not critical. The composition may be formulated as a single composition by combining all the essential components. Alternatively, the rubber composition is formulated into two packs where the two packs are mixed together on use.

Cured parts can be formed by prior art known techniques, for example, by feeding the inventive composition into a suitable mold and causing the composition to cure therein, or by applying the inventive composition onto a suitable substrate and causing the coating to cure. Often, the composition is cured simply by heating at a temperature of about 100 to 180° C. for about 10 seconds to about 30 minutes.

The curable fluoropolyether rubber composition of the invention in the cured state has solvent resistance, chemical resistance and low moisture permeability because of a high fluorine content, smooth parting and water repellency because of low surface energy, good mold release and working efficiency. All these features enable the molding cycle to be completed within a short time and parts of complex shape to be molded in an effective way. Since molded parts themselves are little tacky, sticking is prohibited. In addition, the molded (or cured) parts have satisfactory compression set and smooth parting properties, especially mold release properties. Because of these features, the cured parts find a variety of applications.

Rubber articles using the cured composition of the invention are suitable for use in automobiles, chemical plants, ink jet printers, semiconductor manufacturing lines, analytical or scientific instruments, medical equipment, aircraft or fuel cells and as rubber parts such as diaphragms, valves, O-rings, oil seals, gaskets, packings, joints and face seals.

More illustratively, rubber articles comprising the cured composition of the invention are used as rubber parts for automobiles, rubber parts for chemical plants, rubber parts for ink jet printers, rubber parts for semiconductor manufacturing lines, rubber parts for analytical or scientific instruments, rubber parts for medical equipment, and rubber parts for aircraft, as well as tent film materials, sealants, molded parts, extruded parts, coatings, copier roll materials, electrical moisture-proof coatings, sensor potting materials, fuel cell seals, and laminate rubber fabrics.

Rubber articles made of the cured composition of the invention include, but are not limited to, rubber parts for automobiles, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seals such as oil seals and cylinder head gaskets;

rubber parts for chemical plants, for example, pump diaphragms, valves, O-rings, packings, oil seals, and gaskets;

rubber parts for ink jet printers and semiconductor manufacturing lines, for example, diaphragms, valves, O-rings, packings, and gaskets;

rubber parts for analytical and scientific instruments and medical equipment, for example, pump diaphragms, O-rings, packings, valves, and joints; and rubber parts for aircraft, for example, O-rings, face seals, packings, gaskets, diaphragms, and valves in fluid piping for engine oil, jet fuel, hydraulic oil and Skydrol®.

EXAMPLE

Examples of the invention are given below by way of illustration and not by way of limitation. All parts are by weight.

Preparation of a base compound and evaluation of rubber physical properties of cured compositions are described below.

Preparation of Base Compound

To 100 parts of a polymer of the formula (4) shown below (viscosity 8,500 cs, average molecular weight 22,000, vinyl content 0.009 mol/100 g) was added 25 parts of fumed silica treated with dimethylsiloxy groups and having a specific surface area of 200 m$^2$/g. They were mixed, heat treated and milled on a three-roll mill. To the mixture were added 2.74 parts of a fluorinated organosilicon compound of the formula (5) shown below, 0.2 part of a toluene solution of a catalyst in the form of chloroplatinic acid modified with a compound of the formula (6) shown below (platinum concentration 1.0 wt %) and 0.4 part of a fluorine-modified acetylene alcohol. They were mixed to form a base compound.

Rubber Physical Properties

A rubber composition was deaerated in vacuum, cast into a rectangular frame of 2 mm thick, deaerated again, and press cured at 100 kg/cm$^2$ and 150° C. for 10 minutes. A test specimen was cut from the cured sample and measured for hardness, elongation, tensile strength and tear strength according to JIS K6251, K6252 and K6253. Note that tear strength was measured on crescent shaped specimens. Also the viscosity of a rubber composition was measured according to JIS K7117.

Mold Release

A rubber composition was molded under the same conditions as above except that a mold having six O-ring-forming cavities of JIS P-8 size (whose surface was chromium plated) arranged in a rectangular frame of 2 mm thick was used. By examining how O-rings were removed from the mold, mold release was evaluated according to the following criterion.

⊚: very smooth

○: smooth

Δ: fairly smooth

X: difficult

XX: very difficult

Peeling Force

A rubber composition was molded integrally with a chromium-plated plate (25 mm wide) under the same conditions as in the measurement of rubber physical properties. The force needed to peel the rubber coating from the plate was measured by a strograph E-L (Toyo Seiki Co., Ltd.).

Compression Set

A cured composition was measured for compression set under conditions: 200° C., 20 hours and 25% compression.

Examples 1–5 & Comparative Example 1

To the base compound, 2,2-bis(4-methylphenyl)-hexafluoropropane (referred to as Additive A, hereinafter) or 2,2-bis(3,4-dimethylphenyl)hexafluoropropane (referred to as Additive B, hereinafter) was added in the amount shown in Table 1. The resulting composition was mixed and cured, after which the rubber physical properties, mold release, peeling force and compression set of the cured composition were determined.

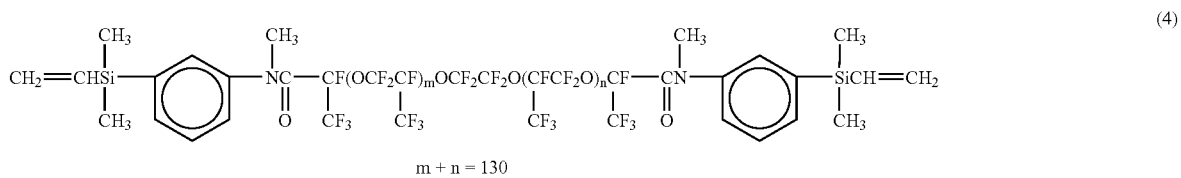

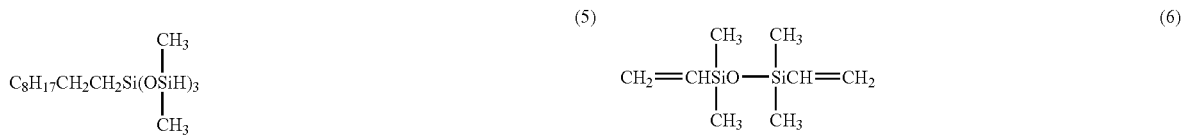

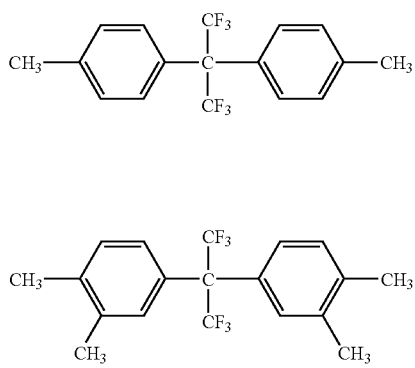

Additive A

Additive B

TABLE 1

| Blending amount | Example | | | | | Comparative Example |
|---|---|---|---|---|---|---|
| (pbw) | 1 | 2 | 3 | 4 | 5 | 1 |
| Base compound | 100 | 100 | 100 | 100 | 100 | 100 |
| Additive A | 0.5 | 1 | 2 | — | — | — |
| Additive B | — | — | — | 1 | 2 | — |
| Properties | | | | | | |
| Viscosity (Pa·s) | 846 | 834 | 866 | 832 | 885 | 858 |
| Hardness (Durometer A) | 53 | 53 | 53 | 52 | 53 | 53 |
| Elongation (%) | 500 | 490 | 540 | 530 | 600 | 460 |
| Tensile strength (MPa) | 9.7 | 9.1 | 8.8 | 8.8 | 9.2 | 9.8 |
| Tear strength (kN/m) | 32 | 34 | 34 | 34 | 32 | 35 |
| Mold release | Δ | ○ | ⊚ | ○ | ⊚ | XX |
| Peeling force (kgf/25 mm) | 0.9 | 0.3 | 0.2 | 0.5 | 0.3 | 1.6 |
| Compression set (%) | 17 | 19 | 20 | 18 | 20 | 18 |

As compared with Comparative Example 1 having no additive added, the compositions of Examples are significantly improved in mold release, substantially equal in compression set and approximately equal in viscosity and other physical properties.

Comparative Examples 2–4

To the base compound, Additive C, D or E, shown below, was added in the amount shown in Table 2. As in Examples, the resulting composition was mixed and cured, after which the rubber physical properties, mold release, peeling force and compression set of the cured composition were determined.

Additive C: 2,2-bis(4-hydroxyphenyl)hexafluoropropane, also known as bisphenol AF

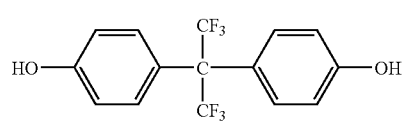

Additive C

Additive D: 2,2-bis(3,4-anhydrodicarboxyphenyl)hexafluoropropane

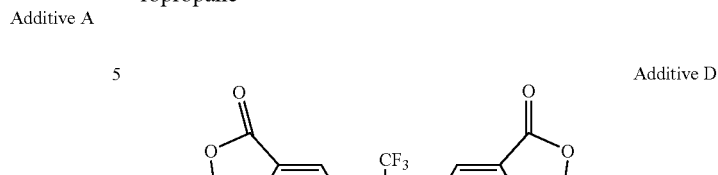

Additive D

Additive E: 2,2-bis(4-carboxyphenyl)hexafluoropropane

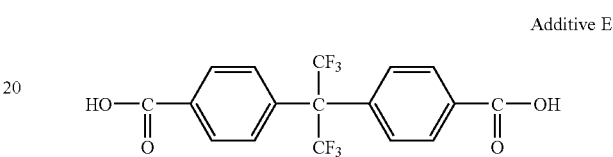

Additive E

Comparative Example 5

Based on the presumption that polar groups in the additive cause degradation of compression set, calcium hydroxide (reagent from Wako Junyaku Co., Ltd.) as an acid acceptor was added to the composition of Comparative Example 2 to examine the effect of neutralization. Compression set was improved little.

The results are shown in Table 2.

TABLE 2

| Blending amount | Comparative Example | | | |
|---|---|---|---|---|
| (pbw) | 2 | 3 | 4 | 5 |
| Base compound | 100 | 100 | 100 | 100 |
| Additive C | 2 | — | — | 2 |
| Additive D | — | 2 | — | — |
| Additive E | — | — | 2 | — |
| Acid acceptor (calcium hydroxide) | — | — | — | 2 |
| Properties | | | | |
| Viscosity (Pa·s) | 868 | 891 | 895 | 920 |
| Hardness (Durometer A) | 56 | 54 | 58 | 56 |
| Elongation (%) | 440 | 440 | 450 | 560 |
| Tensile strength (MPa) | 9.3 | 9.3 | 8.8 | 8.4 |
| Tear strength (kN/m) | 30 | 26 | 20 | 30 |
| Mold release | ⊚ | ○ | ○ | ○ |
| Peeling force (kgf/25mm) | 0.3 | 0.5 | 0.4 | 0.8 |
| Compression set (%) | 32 | 29 | 35 | 26 |

The fluoropolyether rubber compositions of the invention, when cured, exhibit good solvent resistance, chemical resistance, weather resistance, water repellency, oil repellency and heat resistance, and improved parting property, especially improved mold release property as well as satisfactory compression set. Rubber articles comprising the cured compositions are useful as rubber materials for automobiles and aircraft, rubber materials for semiconductor manufacturing apparatus, tent film materials, sealants, molded parts, extruded parts, coatings, copier roll materials, electrical moisture-proof coatings, sensor potting materials, and release paper materials.

Japanese Patent Application No. 2002-236914 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A curable fluoropolyether rubber composition comprising (A) a straight-chain fluoropolyether compound having at least two alkenyl groups in a molecule and a perfluoropolyether structure in the backbone, (B) an organosilicon compound having at least two silicon atom-bonded hydrogen atoms in a molecule, (C) a compound having at least one fluorine atom and at least one benzene ring in a molecule and free of a polar group, the compound having a melting point of at least 50° C. and being in powder form, and (D) a hydrosilylation catalyst.

2. The composition of claim 1 wherein component (A) is a straight-chain fluoropolyether compound of the following general formula (1):

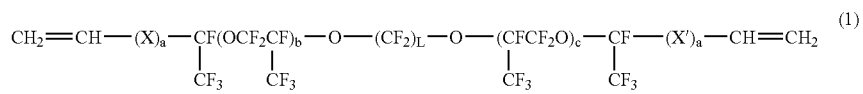

wherein X is —CH$_2$—, —CH$_2$O —, —CH$_2$OCH$_2$— or —Y—NR—CO— wherein Y is —CH$_2$— or a group of the following structural formula (Z):

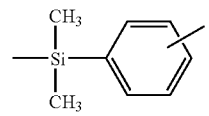

(o, m or p-position), and R is hydrogen, methyl, phenyl or allyl,

X' is —CH$_2$—, —OCH$_2$—, —CH$_2$OCH$_2$— or —CO—NR—Y'— wherein Y' is —CH$_2$— or a group of the following structural formula (Z'):

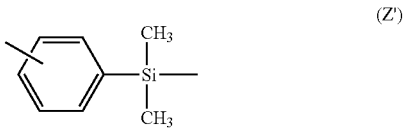

(o, m or p-position), and R is as defined above,

"a" is independently 0 or 1, L is an integer of 2 to 6, and b and c each are an integer of 0 to 200.

3. The composition of claim 1 wherein the compound (C) in powder form has the following general formula (I) or (II):

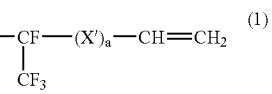

wherein R$^1$ to R$^4$ are each independently hydrogen, a monovalent hydrocarbon group of 1 to 12 carbon atoms or a substituted monovalent hydrocarbon group of 1 to 12 carbon atoms in which some or all of the hydrogen atoms are substituted with fluorine atoms,

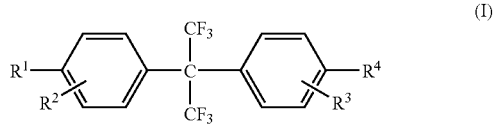

wherein R$^5$ to R$^8$ are each independently hydrogen or a monovalent hydrocarbon group of 1 to 12 carbon atoms, at least one of R$^5$ to R$^8$ is a substituted monovalent hydrocarbon group of 1 to 12 carbon atoms in which some or all of the hydrogen atoms are substituted with fluorine atoms.

4. A rubber article comprising the curable fluoropolyether rubber composition of claim 1 in the cured state.

5. The rubber article of claim 4 for use in automobiles, chemical plants, ink jet printers, semiconductor manufacturing lines, analytical or scientific instruments, medical equipment, aircraft or fuel cells.

6. The rubber article of claim 4 which is a diaphragm, valve, O-ring, oil seal, gasket, packing, joint or face seal.

* * * * *